US 7,065,760 B2
Jun. 20, 2006

(54) REDUCING THE MEMORY FOOTPRINT OF APPLICATIONS EXECUTED IN A VIRTUAL MACHINE

(75) Inventor: Mikhail Dmitriev, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 760 days.

(21) Appl. No.: 10/086,387

(22) Filed: Feb. 28, 2002

(65) Prior Publication Data

US 2003/0163505 A1 Aug. 28, 2003

(51) Int. Cl.
*G06F 9/455* (2006.01)
(52) U.S. Cl. .......................... 718/1; 717/118; 717/120; 717/166
(58) Field of Classification Search .................... 718/1, 718/105; 717/108, 148, 166, 167, 114, 116, 717/118, 120; 711/1, 100
See application file for complete search history.

(56) References Cited

U.S. PATENT DOCUMENTS

| 5,778,234 | A | 7/1998 | Hecht et al. ................ 395/712 |
|---|---|---|---|
| 5,974,454 | A | 10/1999 | Apfel et al. ................ 709/221 |
| 6,052,531 | A | 4/2000 | Waldin, Jr. et al. ......... 395/712 |
| 6,567,974 | B1 * | 5/2003 | Czajkowski ................ 717/151 |
| 6,611,915 | B1 * | 8/2003 | Kubik et al. ................ 713/200 |
| 6,842,897 | B1 * | 1/2005 | Beadle et al. .................. 718/1 |
| 6,901,587 | B1 * | 5/2005 | Kramskoy et al. .......... 717/154 |

FOREIGN PATENT DOCUMENTS

WO    WO 00/45262    8/2000

OTHER PUBLICATIONS

Hou et al. "Distributed and parallel execution of Java programs on a DSM system", 2001 IEEE, pp. 555-559.*

* cited by examiner

*Primary Examiner*—William Thomson
*Assistant Examiner*—Van Nguyen
(74) *Attorney, Agent, or Firm*—Gunnison, McKay & Hodgson, L.L.P.; Philip J. McKay

(57) ABSTRACT

A smaller footprint is loaded into the virtual machine by loading only those methods of library classes that the executed application actually requires. This is accomplished by taking the classes of the targeted application and statically determining which methods of these classes, as well as of the library classes, can actually be used by the application. A generated method usage map of usable methods for each class are saved in a file. At runtime, the virtual machine consults this file and selectively loads into memory only those classes listed in the file. This saves memory space in the virtual machine and speeds execution.

11 Claims, 4 Drawing Sheets

REDUCING THE MEMORY FOOTPRINT OF APPLICATIONS EXECUTED IN A VIRTUAL MACHINE

FIELD OF THE INVENTION

The present invention relates to the field of virtual machines, More particularly, the present invention relates to reducing the memory footprint of applications executed in a virtual machine

BACKGROUND OF THE INVENTION

In computer science, a virtual machine is software that acts as an interface between compiler binary code and the microprocessor (or other hardware platform) that actually performs the machine's instructions. This allows software written for a particular platform to be run on any platform compatible with the virtual machine, without the need for code to be rewritten or recompiled by the programmer for each separate platform. Java Virtual Machine™ (Java VM) from Sun Microsystems of Palo Alto, Calif. is an example of a virtual Machine. Once a Java VM has been provided for a platform, any Java program can run on that platform.

If an application executed by a virtual machine is written in an object-oriented language, the executable code of the application typically takes form of a number of classes that the virtual machine loads in memory and executes. Again, the Java language and its implementation are an example of this.

A class in an object-oriented language can be defined in multiple ways, but for the purposes of this application a class is defined as a collection of methods. A method, in turn, is a chunk of executable code that cab be called (or executed) by other methods from its own class or other classes.

Applications executed by a virtual machine often make the virtual machine load many classes, each containing numerous methods. This is typically due to the fact that library classes are used extensively. A library is a (typically large) collection of classes that implement some common functionality. The so-called core classes defined in the Java language implementation is an example of a class library. While libraries provide convenience for the programmer, allowing them to utilize readily available classes instead of writing the necessary code themselves, it may also waste memory space and processor time. This is due to the fact that only a fraction of methods contained in a typical library class are actually used, i.e., called directly or indirectly by the application code. Nevertheless, the virtual machine dynamically loads into memory a complete representation of each class, even if only one method of this class is actually used. As a result, a significant amount of main memory is wasted at run time. Additionally, virtual machines typically manage memory automatically by performing garbage collection, during which objects in memory are moved around. Thus, the more wasted space utilized in memory, the more time needed to manage it.

FIG. 1 is a diagram illustrating an example of how a virtual machine is typically loaded with classes. Class C 100 has four methods, M1 102, M2 104, M3 106, and M4 108. Class C 100 is contained on disk 110. At execution, the virtual machine loads all of the methods M1 112, M2 114, M3 116, and M4 118 into its memory. However, perhaps only M2 and M4 are referenced in the application code (methods which are referenced in the application code are indicated as such by shading). Therefore, this solution causes the virtual machine to unnecessarily load M1 and M3, which slows execution and wastes memory space.

What is needed is a solution that reduces the size and speed drawbacks of loading complete classes into virtual machines.

BRIEF DESCRIPTION OF THE INVENTION

A smaller memory footprint for the virtual machine is achieved by loading only those methods of classes that the executed application actually requires. This is accomplished by taking the classes of the targeted application and statically determining which methods of these classes, as well as of the library classes, can actually be used by the application. A method usage map of usable methods for each class is saved in a file. At runtime, the virtual machine consults this map and selectively loads into memory only those methods that are in it. This saves memory space in the virtual machine and speeds up execution.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
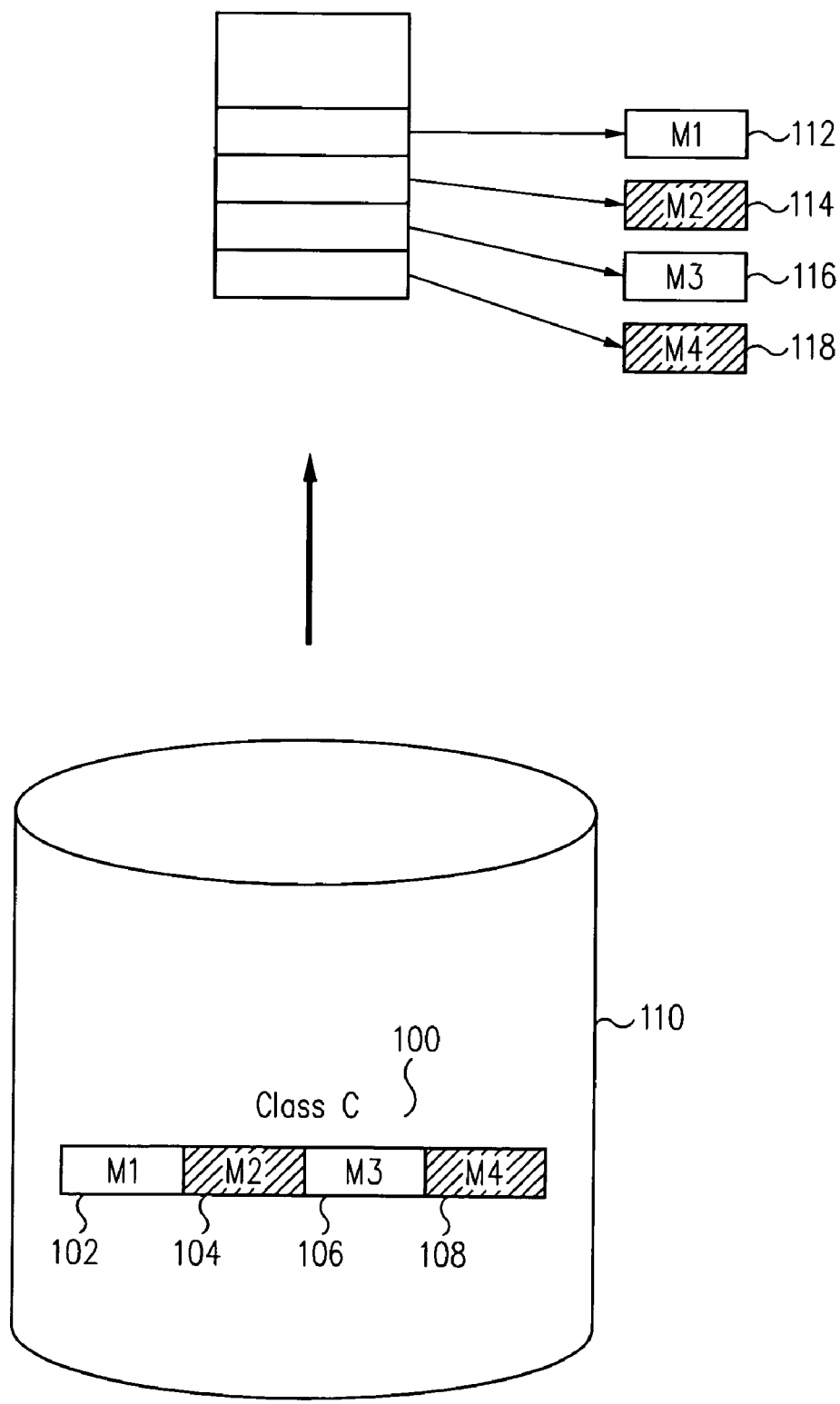
FIG. 1 is a diagram illustrating an example of how a conventional virtual machine loads classes.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A specific embodiment of the present invention may be executed using a Java™ Virtual Machine created by Sun Microsystems, Inc. of Palo Alto, Calif. However, one of ordinary skill in the art will recognize that the present invention may be implemented using a variety of different systems and need not be limited to specific examples provided in this document.

In a specific embodiment of the present invention, execution of an application by a virtual machine results in a smaller memory footprint by loading only those methods of classes that the executed application actually requires. This is accomplished by taking the classes of the targeted application and statically determining which methods of these classes, as well as of the library classes, can actually be used by the application. A generated method usage map of usable methods for each class is saved in a file. At runtime, the virtual machine consults this file and selectively loads into memory only those methods listed in the file.

Figure 2:
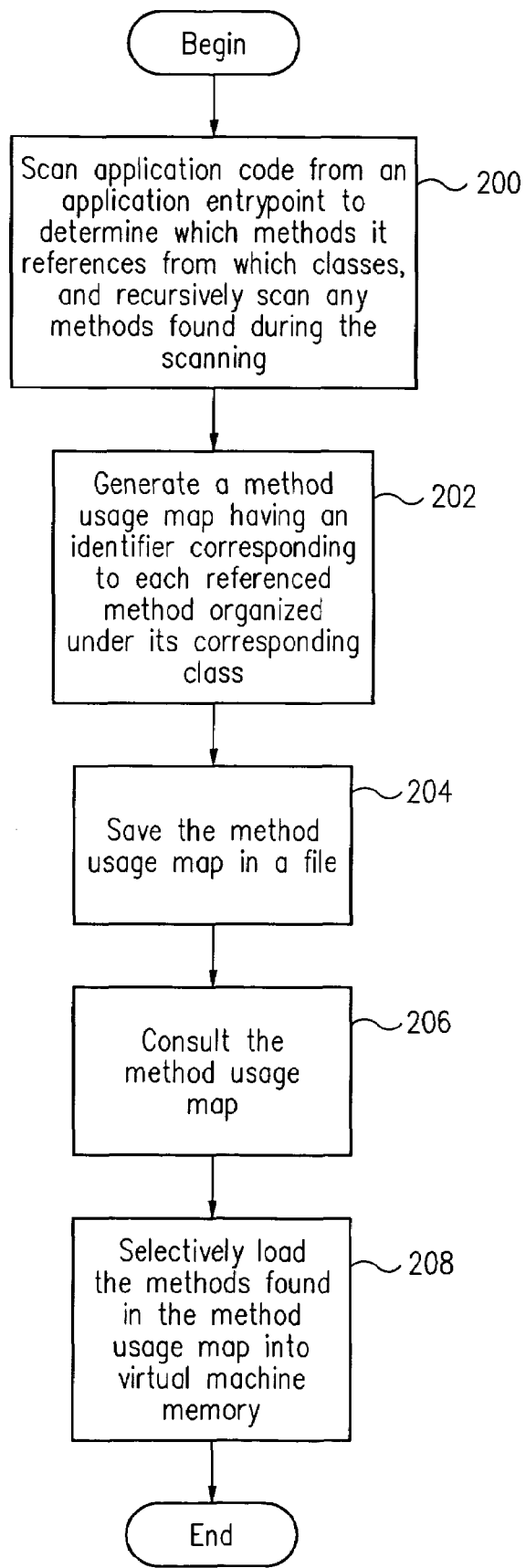
FIG. 2 is a flow diagram illustrating a method for loading methods into a virtual machine, the methods contained in one or more classes, in accordance with a specific embodiment of the present invention.

FIG. 2 is a flow diagram illustrating a method for loading methods into a virtual machine, the methods contained in one or more classes, in accordance with a specific embodiment of the present invention. At 200, application code is scanned from an application entrypoint to determine which methods it references from which classes, and any methods found during the scanning are recursively scanned as well. This produces a transitive closure of all methods that may be called during execution of the application and their corresponding classes. This scanning may be accomplished in such a way that it handles method polymorphism, wherein a method is implemented multiple times within a class and its subclasses. At 202, a method usage map is generated having an identifier for each referenced method organized under its corresponding class. In a specific embodiment of the present invention the identifier may simply be the method name, however other implementations are possible. At 204, the method usage map is saved in a file.

At 206, when the application is executed, the method usage map in the file is consulted. At 208, the virtual machine selectively loads the methods found in the method usage map. Thus, the virtual machine winds up only loading methods that may be needed for execution. This may significantly reduce the footprint in memory and speed up execution. This also provides the advantage that, while unnecessary methods contained in classes are not loaded into the virtual machine, they are still stored on disk (along with the method usage map). It should be noted that disk is merely one implementation of many different types of secondary storage that may be used with a specific embodiment of the present invention. Thus methods of some class C that are not used by application A may be used by another application B and vice versa (that is the common situation if C is a library class). While both applications use the same class, each of them will keep its memory footprint down to the necessary minimum.

Figure 3:
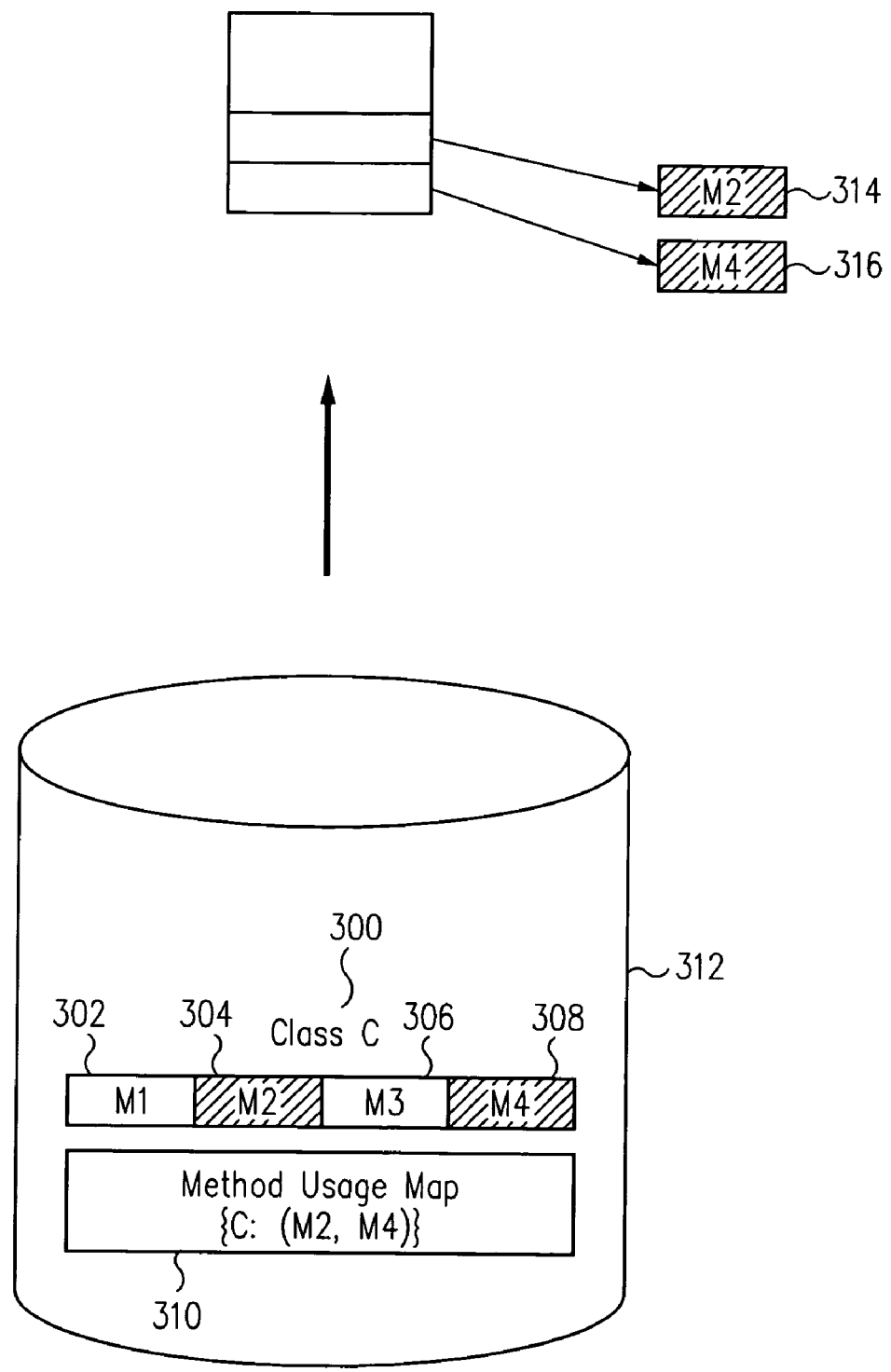
FIG. 3 is a block diagram illustrating an example of the execution of the method of FIG. 2 in accordance with a specific embodiment of the present invention.

FIG. 3 is a block diagram illustrating an example of the execution of the method of FIG. 2 in accordance with a specific embodiment of the present invention. Class C 300 contains four methods, M1 302, M2 304, M3 306, and M4 308. An application may then be scanned and it may be determined that only M2 304 and M4 308 are referenced in the application code (M2 304 and M4 308 are shaded to indicate that they are referenced in the application). Then a method usage map 310 is generated organized by class (the only class here is C, thus C:) with entries for the referenced methods in each class (here, M2 and M4). The method usage map 310 and the class 300 are stored on disk 312.

When the virtual machine runs, it consults the method usage map 310 stored in the database 312 and discovers that class C is referenced. It further finds that within class C, only M2 and M4 are referenced. Therefore, it loads only M2 314 and M4 316 into its memory. Any method within any class that is not referenced is not loaded.

Figure 4:
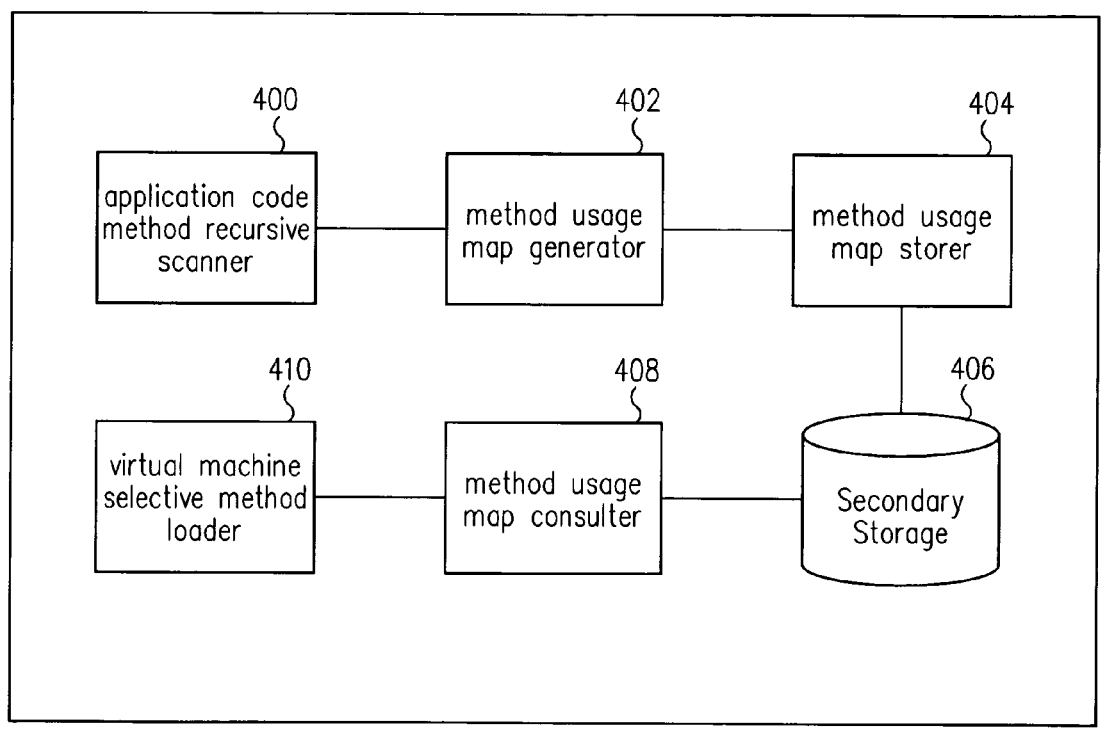
FIG. 4 is a block diagram illustrating an apparatus for loading methods into a virtual machine, the methods contained in one or more classes, in accordance with a specific embodiment of the present invention.

FIG. 4 is a block diagram illustrating an apparatus for loading methods into a virtual machine, the methods contained in one or more classes, in accordance with a specific embodiment of the present invention. An application code method recursive scanner 400 scans application code from an application entrypoint to determine which methods it references from which classes, and any methods found during the scanning are recursively scanned as well. This produces a transitive closure of all methods that may be called during execution of the application and their corresponding classes. A method usage map generator 402 coupled to the application code method recursive scanner 400 generates a method usage map having an identifier for each referenced method organized under its corresponding class. A method usage map storer 404 coupled to the method usage map generator 402 and to a disk 406 saves the method usage map in a file on the disk 406.

When the application is executed, a method usage map consulter 408 coupled to the database 406 consults the method usage map in the file. A virtual machine selective loader 410 coupled to the method usage map consulter 408 selectively loads the methods found in the method usage map. Thus, the virtual machine winds up only loading methods that may be needed for execution.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for loading methods into a virtual machine, the methods contained in one or more classes, the method including:

recursively scanning through application code beginning at an application entrypoint to determine which methods may be called and the classes to which they correspond;

wherein said recursively scanning includes:
finding all methods referenced in said application code; and
finding all methods referenced in methods referenced in said application code;

generating a method usage map having an identifier corresponding to each referenced method organized under its corresponding class;

storing identifiers corresponding to all said methods referenced in said application code and all said methods referenced in methods referenced in said application code in said method usage map organized by classes;

consulting said method usage map upon execution of the virtual machine; and selectively loading only those methods contained in said method usage map into memory in the virtual machine.

2. The method of claim 1, wherein said storing includes storing said method usage map in a file located in secondary storage.

3. The method of claim 2, wherein each of the classes is stored in secondary storage.

4. The method of claim 1, wherein said recursively scanning includes statically determining which methods of the classes may actually be used by the application.

5. The method of claim 1, wherein said recursively scanning includes handling method polymorphism.

6. An apparatus for loading methods into a virtual machine, the methods contained in one or more classes, the apparatus including:

means for recursively scanning through application code beginning at an application entrypoint to determine which methods may be called and the classes to which they correspond;

wherein said recursively scanning includes:

finding all methods referenced in said application code; and finding all methods referenced in methods referenced in said application code;

means for generating a method usage map having an identifier corresponding to each referenced method organized under its corresponding class;

means for storing identifiers corresponding to all said methods referenced in said application code and all said methods referenced in methods referenced in said application code in said method usage map organized by classes;

means for consulting said method usage map upon execution of the virtual machine; and means for selectively loading only those methods contained in said method usage map into memory in the virtual machine.

7. The apparatus of claim 6, wherein said means for storing includes means for storing said method usage map in a file.

8. The apparatus of claim 7, wherein each of the classes is stored in a secondary storage.

9. The apparatus of claim 6, wherein said means for recursively scanning includes means for statically determining which methods of the classes may actually be used by the application.

10. The apparatus of claim 6, wherein said means for recursively scanning includes means for handling method polymorphism.

11. A program storage device readable by a machine, tangibly embodying a program of instructions executable by the machine to perform a method for loading methods into a virtual machine, the methods contained in one or more classes, the method including:

recursively scanning through application code beginning at an application entrypoint to determine which methods may be called and the classes to which they correspond;

wherein said recursively scanning includes:

finding all methods referenced in said application code; and finding all methods referenced in methods referenced in said application code;

generating a method usage map having an identifier corresponding to each referenced method organized under its corresponding class;

storing identifiers corresponding to all said methods referenced in said application code and all said methods referenced in methods referenced in said application code in said method usage map organized by classes;

consulting said method usage map upon execution of the virtual machine; and selectively loading only those methods contained in said method usage map into memory in the virtual machine.

* * * * *